(12) United States Patent
Mueller

(10) Patent No.: US 11,192,764 B2
(45) Date of Patent: Dec. 7, 2021

(54) PAN ASSEMBLY FOR AERIAL WORK PLATFORM

(71) Applicant: MCF Distributing, LLC, Mill Creek, WA (US)

(72) Inventor: Mark S. Mueller, SeaTac, WA (US)

(73) Assignee: MCF Distributing, LLC, Mill Creek, WA (US)

( * ) Notice: Subject to any disclaimer, the term of this patent is extended or adjusted under 35 U.S.C. 154(b) by 16 days.

(21) Appl. No.: 15/959,838

(22) Filed: Apr. 23, 2018

(65) Prior Publication Data

US 2018/0305193 A1 Oct. 25, 2018

Related U.S. Application Data

(60) Provisional application No. 62/488,857, filed on Apr. 24, 2017.

(51) Int. Cl.
| | |
|---|---|
| *B66F 17/00* | (2006.01) |
| *B66F 11/04* | (2006.01) |
| *F16B 5/06* | (2006.01) |
| *B66F 13/00* | (2006.01) |
| *B66F 9/065* | (2006.01) |

(52) U.S. Cl.
CPC ............ *B66F 17/006* (2013.01); *B66F 9/065* (2013.01); *B66F 11/044* (2013.01); *B66F 13/00* (2013.01); *F16B 5/0621* (2013.01)

(58) Field of Classification Search
CPC ...... B66F 17/006; B66F 13/00; B66F 11/044; F16B 5/0621
See application file for complete search history.

(56) References Cited

U.S. PATENT DOCUMENTS

| | | | | |
|---|---|---|---|---|
| 463,597 | A * | 11/1891 | Cussen | B65D 33/28 383/75 |
| 568,960 | A * | 10/1896 | Shaw | A62B 1/22 182/140 |
| 595,685 | A * | 12/1897 | Abraham | B65D 45/28 217/124 |
| 2,529,948 | A * | 11/1950 | Jones | B63C 3/06 254/281 |

(Continued)

*Primary Examiner* — Colleen M Chavchavadze
*Assistant Examiner* — Candace L Bradford
(74) *Attorney, Agent, or Firm* — Clements Bernard Baratta; Robert R. Richardson

(57) ABSTRACT

Disclosed embodiments include pan assemblies for aerial work platforms, methods of attaching a pan assembly to an aerial work platform, and methods of fabricating a pan assembly for an aerial work platform. In an illustrative embodiment given by way of non-limiting example, a non-limiting, illustrative pan assembly for an aerial work platform includes a pan configured to be disposed about a lower portion of a basket of an aerial work platform. A plurality of attachment mechanisms are disposed about an exterior of the pan, the plurality of attachment mechanisms being configured to removably attach the pan to a lower portion of a basket of an aerial work platform. A tensioning system is disposed within an interior of the pan, the tensioning system being configured to cooperate with the plurality of attachment mechanisms to hold the pan onto a lower portion of a basket of an aerial work platform.

19 Claims, 8 Drawing Sheets

(56) References Cited

U.S. PATENT DOCUMENTS

| | | | | |
|---|---|---|---|---|
| 2,723,885 A * | 11/1955 | Dietz | E04G 3/18 182/57 |
| 2,778,398 A * | 1/1957 | Edwards | A47J 47/19 220/632 |
| 3,139,948 A * | 7/1964 | Rorden | B66F 11/044 182/2.4 |
| 3,286,855 A * | 11/1966 | Bill | B66F 11/044 414/23 |
| 3,385,398 A * | 5/1968 | Garnett | E06C 5/06 182/46 |
| 3,459,318 A * | 8/1969 | Clark | A01D 46/22 414/508 |
| 3,533,487 A * | 10/1970 | Norin | E04G 3/32 182/19 |
| 3,710,893 A * | 1/1973 | Hippach | B66F 11/046 182/2.5 |
| 3,805,916 A * | 4/1974 | Milam | A62B 1/22 182/138 |
| 3,827,471 A * | 8/1974 | Gregory | B65D 88/1668 222/181.3 |
| 3,893,595 A * | 7/1975 | Khanna | B65D 88/1681 222/181.3 |
| 3,921,757 A * | 11/1975 | Kennedy | A62B 1/22 182/48 |
| 3,949,834 A * | 4/1976 | Nusbaum | E04G 21/3261 182/138 |
| 4,031,589 A * | 6/1977 | Couch | B05C 17/0222 15/248.1 |
| 4,127,185 A * | 11/1978 | Ritter, Jr. | A62B 1/22 182/140 |
| 4,143,796 A * | 3/1979 | Williamson | B65D 88/1612 222/181.3 |
| 4,194,652 A * | 3/1980 | Williamson | B65D 88/1612 112/418 |
| 4,240,474 A * | 12/1980 | Perkins | B62B 3/106 141/231 |
| 4,254,846 A * | 3/1981 | Soave | B65D 25/18 182/2.4 |
| 4,315,535 A * | 2/1982 | Battle | B60J 11/00 150/166 |
| 4,337,812 A * | 7/1982 | Trinkner | A45C 9/00 206/541 |
| 4,341,286 A * | 7/1982 | Gregory | A62B 1/20 182/10 |
| 4,419,232 A * | 12/1983 | Arntyr | E03C 1/262 210/164 |
| 4,732,234 A * | 3/1988 | Brickman | E04G 21/3266 182/138 |
| 4,736,488 A * | 4/1988 | Nielsen | B05C 21/00 118/504 |
| 4,738,335 A * | 4/1988 | Ishii | E04G 3/30 182/129 |
| 4,749,011 A * | 6/1988 | Rylander | B65B 67/1238 141/114 |
| 4,763,758 A * | 8/1988 | Moody | B66F 11/044 182/2.1 |
| 4,802,773 A * | 2/1989 | Gross | B65D 29/00 383/16 |
| 4,805,735 A * | 2/1989 | Anderson | E04G 1/20 182/129 |
| 4,811,419 A * | 3/1989 | Derby | B65D 88/1668 222/530 |
| 4,817,824 A * | 4/1989 | LaFleur | B65D 90/205 206/600 |
| 4,917,507 A * | 4/1990 | Davidson | B65D 88/1612 383/121 |
| 4,928,929 A * | 5/1990 | Kinder | E04G 21/3204 256/19 |
| 4,955,068 A * | 9/1990 | Tennihan | B65B 67/12 141/114 |
| 5,011,216 A * | 4/1991 | Baughman | B60P 3/38 135/88.13 |
| 5,092,681 A * | 3/1992 | Ashley, III | B65D 33/28 383/4 |
| 5,161,641 A * | 11/1992 | Nusbaum | E04G 21/3223 182/129 |
| 5,213,141 A * | 5/1993 | Dorman | B65F 1/0006 141/10 |
| 5,340,218 A * | 8/1994 | Cuthbertson | B65D 88/1668 206/600 |
| 5,423,586 A * | 6/1995 | Fuller | A45C 3/00 294/149 |
| 5,429,206 A * | 7/1995 | Nusbaum | E01D 19/106 182/138 |
| 5,452,973 A * | 9/1995 | Arvin | B60P 7/0876 410/117 |
| 5,507,596 A * | 4/1996 | Bostelman | B63B 35/00 405/191 |
| 5,511,846 A * | 4/1996 | Fuller | A45C 3/00 294/149 |
| 5,611,410 A * | 3/1997 | Baillargeon | B66F 11/044 182/129 |
| 5,975,351 A * | 11/1999 | DeLacerda | B65B 69/0075 222/1 |
| 6,019,243 A * | 2/2000 | Marino | B65D 90/24 220/573 |
| 6,079,934 A * | 6/2000 | Beale | B65D 88/1612 294/68.1 |
| 6,101,663 A * | 8/2000 | Greer, Jr | A47L 13/08 15/236.01 |
| 6,149,252 A * | 11/2000 | Browning | B08B 15/026 134/200 |
| 6,155,772 A * | 12/2000 | Beale | B65D 90/046 414/607 |
| 6,161,648 A * | 12/2000 | Rexroad | A62B 1/22 182/138 |
| 6,196,543 B1 * | 3/2001 | Cornett | A63F 3/00895 206/315.1 |
| 6,241,389 B1 * | 6/2001 | Gilmore | B65D 33/28 229/87.19 |
| 6,273,156 B1 * | 8/2001 | Carrillo | B65B 67/12 141/108 |
| 6,273,401 B1 * | 8/2001 | Payne | B66C 1/18 212/166 |
| 6,287,002 B1 * | 9/2001 | Sherman | A45C 13/1046 383/24 |
| 6,537,446 B1 * | 3/2003 | Sanguinetti | E03F 1/00 210/163 |
| D493,657 S * | 8/2004 | Farago | D6/608 |
| 6,857,504 B1 * | 2/2005 | Branter | E04G 3/26 182/113 |
| 6,986,621 B2 * | 1/2006 | Allard | B01D 29/27 405/36 |
| 7,216,572 B2 * | 5/2007 | Keenan | B23D 59/006 144/252.1 |
| 7,325,264 B2 * | 2/2008 | Holmes | A47C 17/82 5/114 |
| 7,389,855 B2 * | 6/2008 | Rexroad | E04G 21/3266 182/138 |
| 7,819,262 B1 * | 10/2010 | Ewan | B60P 7/0876 212/325 |
| 8,113,220 B2 * | 2/2012 | Inglese | B65F 1/0006 134/104.1 |
| 8,177,087 B2 * | 5/2012 | Noble | B08B 17/025 220/9.4 |
| 8,414,367 B1 * | 4/2013 | Virag | F24F 1/027 454/204 |
| 9,550,079 B2 * | 1/2017 | D'Angelo | A62B 1/22 |
| D786,555 S * | 5/2017 | Brungraber | D3/284 |
| 9,758,360 B2 * | 9/2017 | Stanford | B66F 17/006 |
| 10,024,071 B2 * | 7/2018 | Cockerell | E04G 21/30 |
| 10,442,575 B1 * | 10/2019 | DiSpazio | B65D 33/02 |
| 10,730,730 B2 * | 8/2020 | Mueller | B66F 17/006 |
| 2002/0104710 A1 * | 8/2002 | Thompson | A62B 1/22 182/138 |
| 2006/0021125 A1 * | 2/2006 | Berenson | E04H 4/0025 4/498 |

(56) References Cited

U.S. PATENT DOCUMENTS

| | | | | |
|---|---|---|---|---|
| 2007/0158223 A1* | 7/2007 | Terry | A45C 7/0054 | 206/373 |
| 2008/0105497 A1* | 5/2008 | Ashley | B66F 11/042 | 187/269 |
| 2009/0044327 A1* | 2/2009 | Cheng | E04H 4/0025 | 4/506 |
| 2009/0294215 A1* | 12/2009 | Vos | F16B 7/18 | 182/141 |
| 2010/0200332 A1* | 8/2010 | Bowden | B66F 17/006 | 182/113 |
| 2011/0277883 A1* | 11/2011 | Noonan | A01G 20/43 | 141/337 |
| 2012/0128269 A1* | 5/2012 | Rittenour | B65D 33/06 | 383/4 |
| 2012/0152653 A1* | 6/2012 | Bowden | B66F 11/044 | 182/113 |
| 2013/0228396 A1* | 9/2013 | Cummings | B66F 11/04 | 182/129 |
| 2015/0096836 A1* | 4/2015 | Stanford | B66F 17/006 | 182/112 |
| 2015/0291404 A1* | 10/2015 | Biava | B66F 7/08 | 182/148 |
| 2016/0161046 A1* | 6/2016 | Miles | B66F 11/046 | 182/141 |
| 2016/0184856 A1* | 6/2016 | Westfall | B05C 17/06 | 118/505 |
| 2016/0362284 A1* | 12/2016 | Haessler | E04G 1/18 | |
| 2016/0368738 A1* | 12/2016 | Minke | B66F 11/04 | |
| 2017/0035264 A1* | 2/2017 | Brogan | E04F 21/00 | |
| 2017/0233232 A1* | 8/2017 | Davis | B66F 11/042 | 182/69.5 |
| 2019/0023549 A1* | 1/2019 | Mueller | B66F 13/00 | |
| 2019/0106309 A1* | 4/2019 | Mueller | B66F 13/00 | |
| 2019/0177143 A1* | 6/2019 | Hester | B66F 11/04 | |
| 2021/0076557 A1* | 3/2021 | McCain | B66F 17/006 | |

* cited by examiner

PAN ASSEMBLY FOR AERIAL WORK PLATFORM

TECHNICAL FIELD

The present disclosure relates to accessories for aerial work platforms.

BACKGROUND

An aerial work platform is a mechanical device used to provide temporary access for people or equipment to inaccessible areas, usually at height. Aerial work platforms are generally used for temporary, flexible access purposes such as maintenance and construction work, such as painting and the like.

One type of aerial work platform is known as a boom lift (sometimes referred to as a "cherry picker"). A boom lift includes a mobile base unit with a boom extending therefrom. The boom may have any number of sections as desired. The sections may be articulating or telescoping.

A basket is attached to the end of the boom. In a typical boom lift, a mounting bracket is attached to the end of the boom. A vertical member extends vertically downwardly from the mounting bracket. Horizontal members (such as forks) extend horizontally from the vertical member. The basket is attached, such as by being bolted, onto a distal end of the horizontal members.

The basket includes guard rails and a control panel for controlling functions such as raising and lowering the basket, rotating the basket, driving and steering the mobile base unit, and the like.

The basket also includes a floor. The floor typically is made from an expanded metal grate. The use of an expanded metal grate helps reduce weight. However, if liquids (such as paint or the like), powders, or other solids (such as fasteners, tools, or the like) were spilled or dropped in the basket, then the liquids, powders, and solids smaller than gaps between grate members will fall onto the ground or the floor.

SUMMARY

Disclosed embodiments include pan assemblies for aerial work platforms, methods of attaching a pan assembly to an aerial work platform, and methods of fabricating a pan assembly for an aerial work platform.

In an illustrative embodiment given by way of non-limiting example, a non-limiting, illustrative pan assembly for an aerial work platform includes a pan configured to be disposed about a lower portion of a basket of an aerial work platform. A plurality of attachment mechanisms are disposed about an exterior of the pan, the plurality of attachment mechanisms being configured to removably attach the pan to a lower portion of a basket of an aerial work platform. A tensioning system is disposed within an interior of the pan, the tensioning system being configured to cooperate with the plurality of attachment mechanisms to hold the pan onto a lower portion of a basket of an aerial work platform.

In another illustrative embodiment given by way of non-limiting example, a non-limiting, illustrative method of attaching a pan assembly to an aerial work platform includes: disposing a pan about a lower portion of a basket of an aerial work platform; removably attaching the pan to a lower portion of a basket of an aerial work platform with a plurality of attachment mechanisms disposed about an exterior of the pan; and engaging a tensioning system disposed within an interior of the pan to cooperate with the plurality of attachment mechanisms to hold the pan onto a lower portion of a basket of an aerial work platform.

In another illustrative embodiment given by way of non-limiting example, a non-limiting, illustrative method of fabricating a pan assembly for an aerial work platform includes: forming a pan configured to be disposed about a lower portion of a basket of an aerial work platform; disposing a plurality of attachment mechanisms about an exterior of the pan, the plurality of attachment mechanisms being configured to removably attach the pan to a lower portion of a basket of an aerial work platform; and disposing a tensioning system within an interior of the pan, the tensioning system being configured to cooperate with the plurality of attachment mechanisms to hold the pan onto a lower portion of a basket of an aerial work platform.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the text (e.g., claims and/or detailed description) and/or drawings of the present disclosure.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

The use of the same symbols in different drawings typically indicates similar or identical items unless context dictates otherwise.

DETAILED DESCRIPTION

Figure 1:
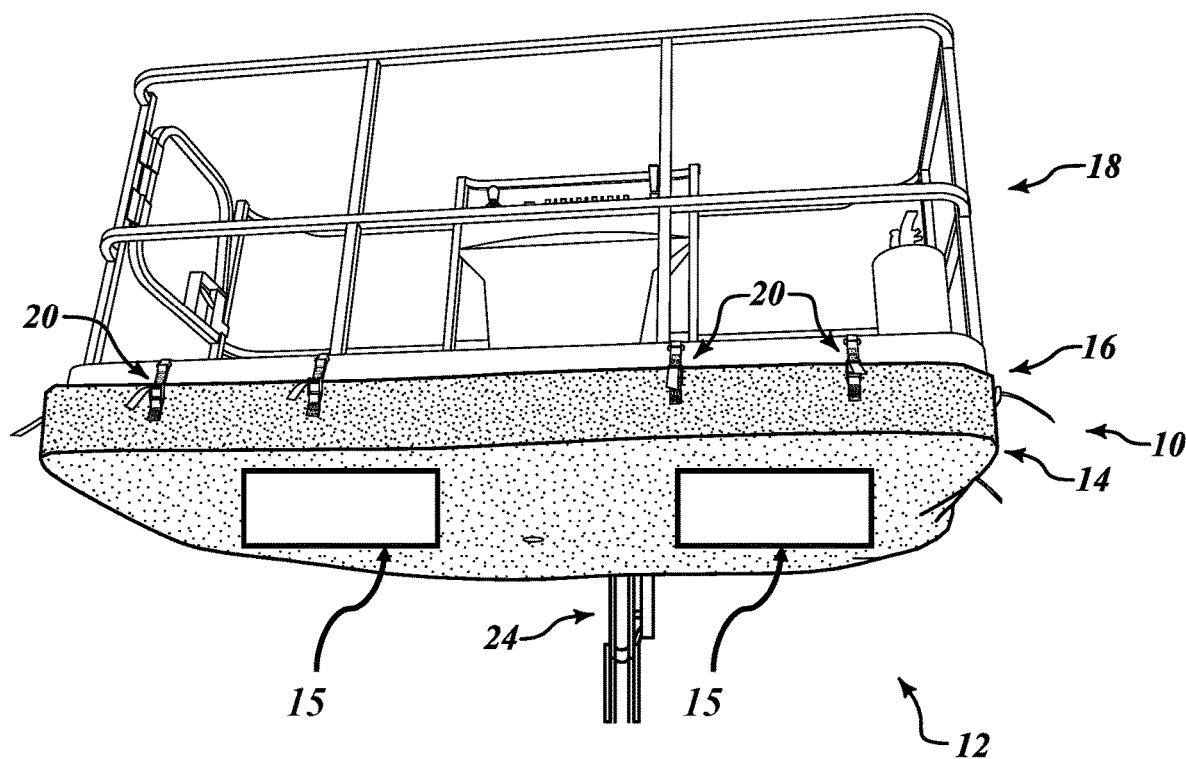
FIG. 1 is a front perspective view of an illustrative pan assembly attached to an aerial work platform.

Given by way of non-limiting overview and referring to FIG. 1, an illustrative pan assembly 10 for an aerial work platform 12 (such as a boom lift) includes a pan 14 configured to be disposed about a lower portion 16 of a basket 18 of the aerial work platform 12. Attachment mechanisms 20 are disposed about an exterior of the pan 14. The attachment mechanisms 20 are configured to removably attach the pan 14 to the lower portion 16 of the basket 18. A tensioning system (not shown in FIG. 1) is disposed within an interior of the pan 14. The tensioning system is configured to cooperate with the attachment mechanisms 20 to hold the pan 14 onto the lower portion 16 of the basket 18.

Still by way of overview, in various embodiments the pan assembly 10 is configured for use with an aerial work platform 12 such as a boom lift (also referred to as a "cherry picker"). As is known, the aerial work platform 12 may be used for temporary, flexible access purposes such as maintenance and construction work. As such, workers in the basket 18 may perform tasks such as, without limitation, painting, cleaning, inspection, preventive maintenance, installation, removal, repairs, and the like. Therefore, workers may be engaged in tasks that entail use of liquids, powders, fasteners, and/or tools. If liquids (such as paint, cleaning agents, or the like), powders, or other solids (such as fasteners, tools, or the like) were spilled or dropped in the basket, then the liquids, powders, and solids smaller than gaps between grate members will collect in the pan 14 instead of falling onto the ground or the floor. Moreover, during performance of preventive maintenance procedures or repairs, an amount of liquids (that remains within or does not exceed weight restrictions or stability restrictions) may be drained aloft from equipment and may be collected aloft in the pan 14 for later, and controlled, disposal when the basket 18 has been returned to ground level. Also, if desired, during performance of preventive maintenance procedures or repairs, any amount of liquids as desired may be drained aloft from equipment and may drain through a drainage port (described below) and to a collection facility via a hose or the like.

Details will be set forth below by way of illustrative examples and not of limitation.

Figure 2:
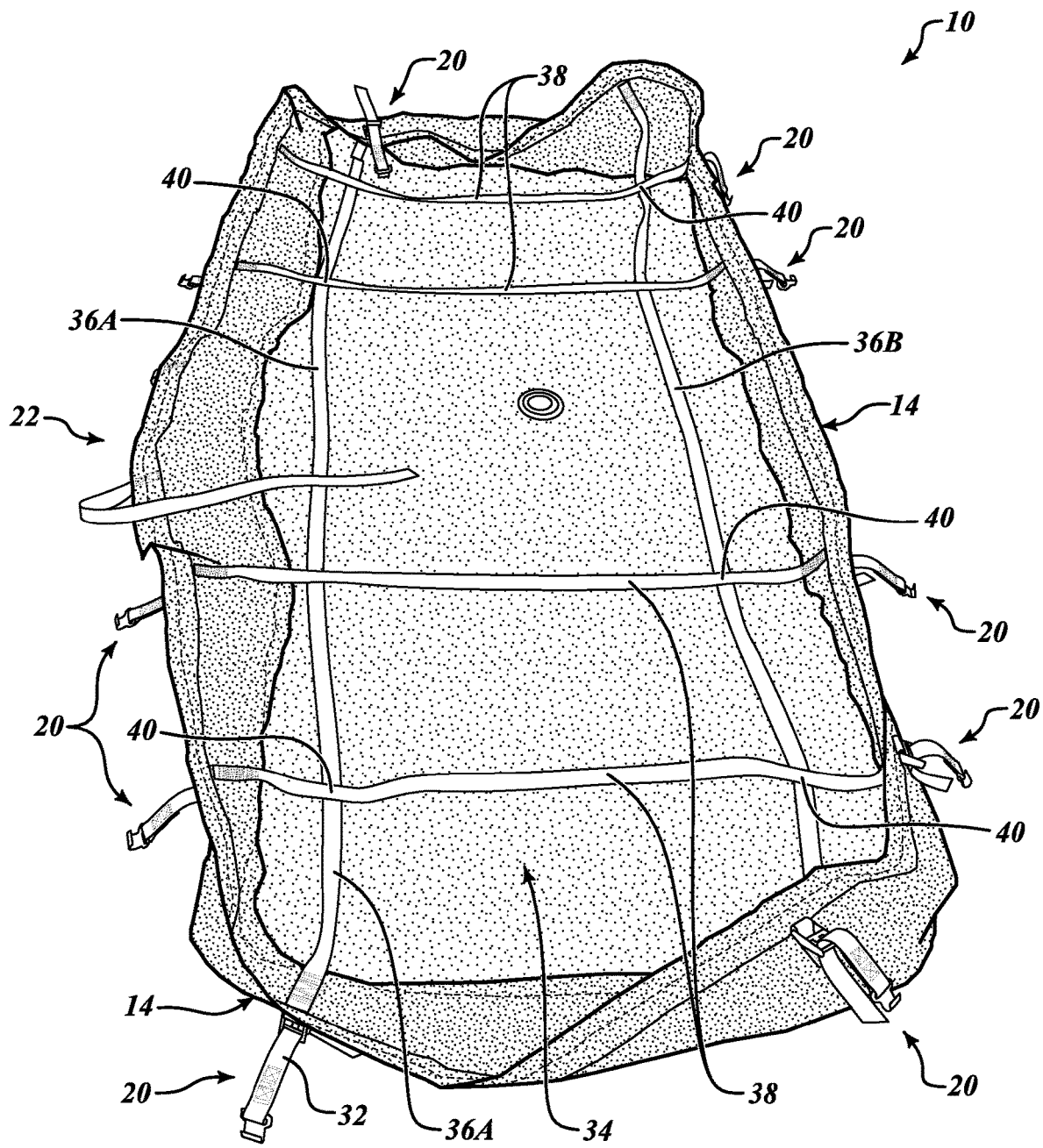
FIG. 2 is a perspective view of the pan assembly of FIG. 1.
Figure 3:
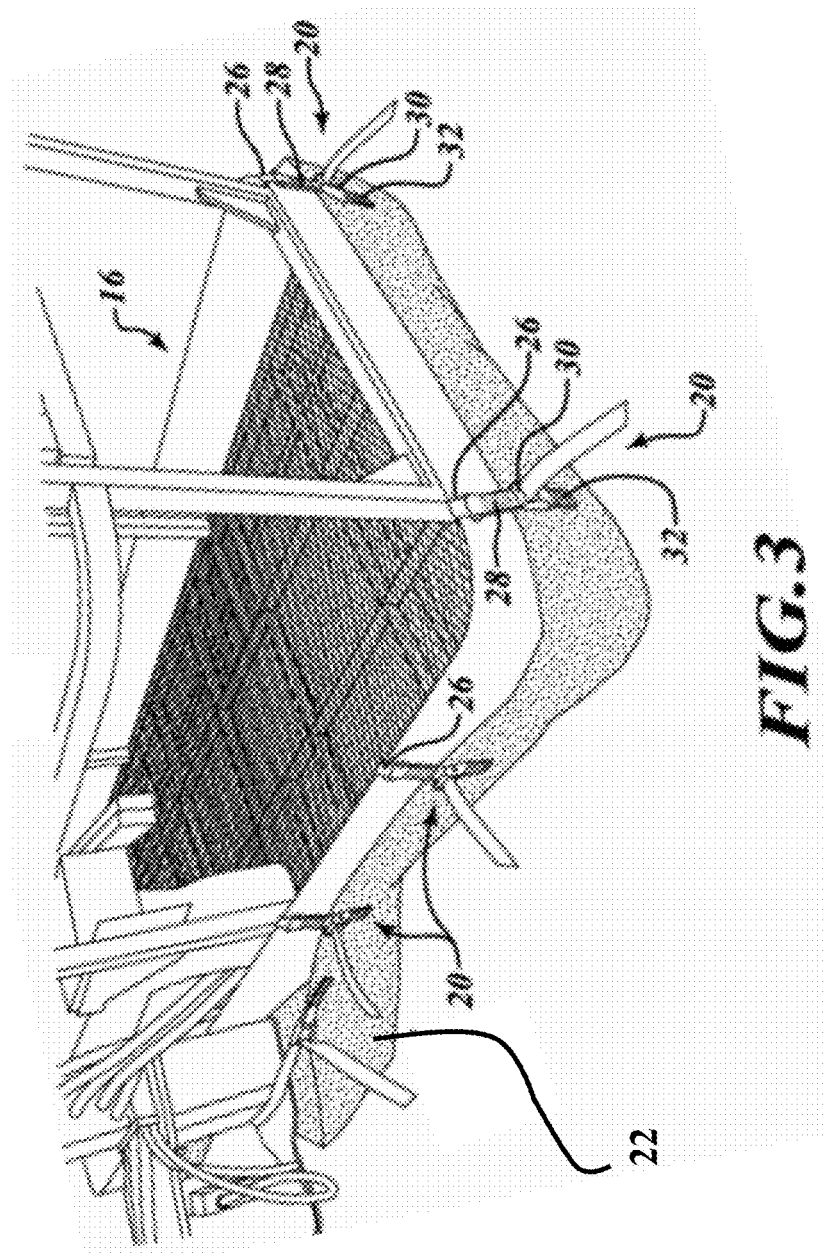
FIG. 3 illustrates details of attachment of the pan assembly of FIG. 1 to an aerial work platform.

Referring additionally to FIGS. 2 and 3, in various embodiments the pan 14 includes an accommodation section 22 that is configured to accommodate structure that attaches a boom 24 of the aerial work platform 12 to the basket 18. As is known, typical structure that attaches the boom 24 of the aerial work platform 12 to the basket 18 includes a mounting bracket that is attached to the end of the boom 24, a vertical member that extends vertically downwardly from the mounting bracket, and horizontal members (such as forks) that extend horizontally from the vertical member. Such structure may be implemented in different ways by different manufacturers. To that end, the accommodation section 22 may be sized and shaped as desired for a particular aerial work platform 12 from a particular manufacturer. While the accommodation section 22 shown in FIG. 2 has a shape that is generally arcuate, it will be appreciated that shape of the accommodation section 22 is not so limited. In other embodiments, the accommodation section 22 may have a generally rectangular shape. The shape of the accommodation section 22 is not intended to be limited whatsoever and may have any shape as desired to accommodate structure that attaches the boom 24 of the aerial work platform 12 to the basket 18 as desired based upon design of the structure by the manufacturer of the aerial work platform 12.

In various embodiments the pan 14 is made of flexible material, such as without limitation cotton and/or vinyl. In applications in which consumables and materials used in the basket 18 do not include liquids, the pan 14 may be made of cotton and may be fabricated by a process such as sewing. In some embodiments the pan 14 may be made entirely of vinyl and may be fabricated by a process such as radiofrequency welding. Regardless of whether the pan 14 is made of cotton or vinyl, in some other embodiments the pan 14 may include one or more vinyl windows 15. In such embodiments, the vinyl window 15 is made of clear vinyl that permits a worker to look through the window 15, thereby helping increase visibility when the pan assembly 10 is attached to the basket 18.

Embodiments of the pan 14 are sized to capture that which is in the basket 18. In various embodiments and given by way of illustration only and not of limitation, the pan 14 may be sized to hold as much as about 30 gallons or so of liquid. However, it will be appreciated that the pan 14 may be sized to hold any volume as desired for a particular application (within weight restrictions and stability restrictions) and within operating limitations of material from which the pan 14 is made.

Figure 4:
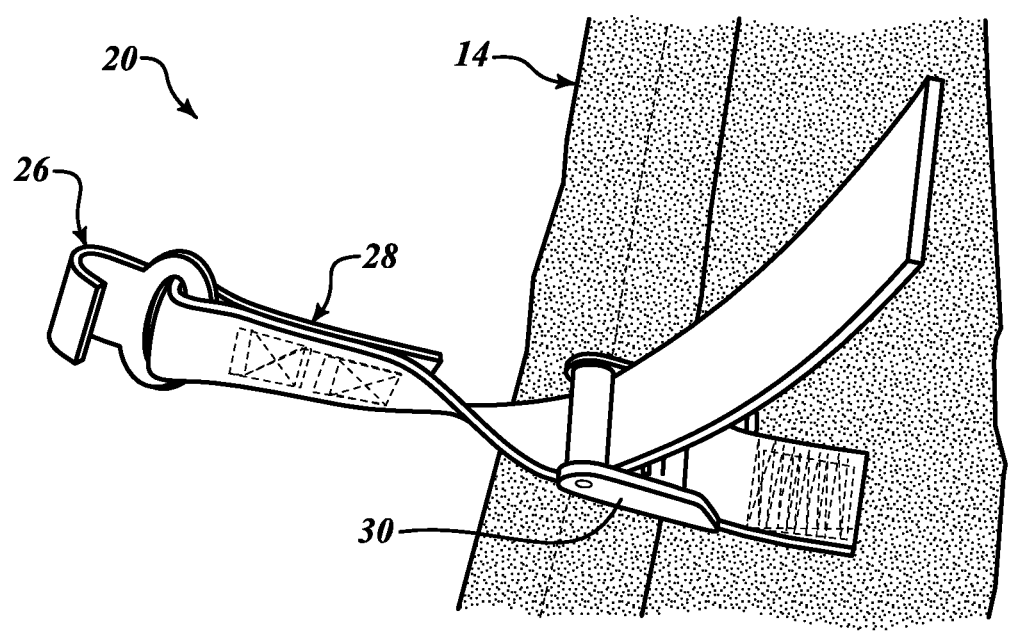
FIG. 4 illustrates details of an attachment mechanism of the pan assembly of FIG. 1.

Referring additionally to FIG. 4, the attachment mechanisms 20 are configured to removably attach the pan 14 to the lower portion 16 of the basket 18. In various embodiments the attachment mechanisms 20 include a hook 26 configured to engage the lower portion 16 of the basket 18 (such as by being placed on top of a kick plate or wall). It will be appreciated that, when sufficiently tightened, the hooks 26 help keep the pan assembly 10 from being removed inadvertently from the basket 18, such as by being kicked inadvertently by a worker in the basket. A strap 28 is attached to the hook 26, such as by sewing. A cam buckle 30 is configured to receivably engage the strap 28. A strap 32 is attached to the cam buckle 30 and (as described below) is attached to an exterior of the pan 14.

Figure 5:
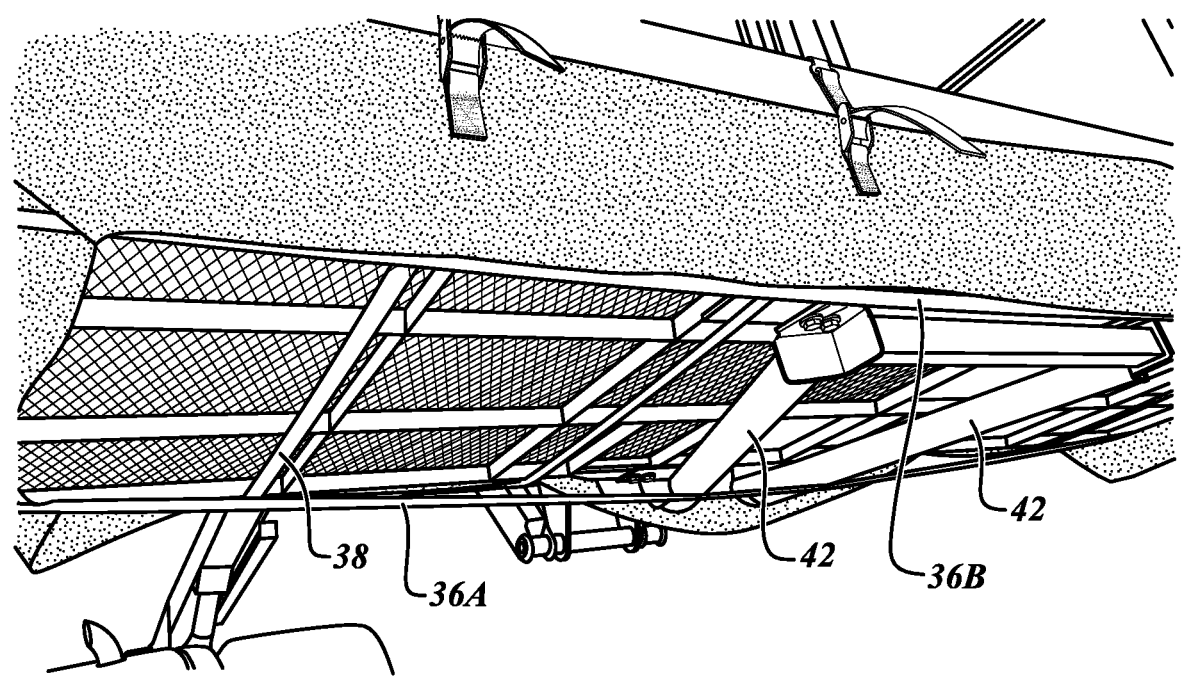
FIG. 5 is a perspective view in partial cutaway that illustrates details of attachment of the pan assembly of FIG. 1 to an aerial work platform.

Referring additionally to FIG. 5 and as shown in FIG. 2, the tensioning system is indicated at 34 (FIG. 2) and is disposed within an interior of the pan 14. The tensioning system is configured to cooperate with the attachment mechanisms 20 to hold the pan 14 onto the lower portion 16 of the basket 18. In various embodiments the tensioning system 34 includes a matrix of rows of straps 36A and 36B along a major axis of the pan 14 and columns of straps 38 along a minor axis of the pan 14. The straps 36A, 36B, and 38 are attached at their ends to the interior of the pan 14 and to straps 32 that are aligned with the straps 36A, 36B, and 38. For example, in some embodiments the straps 36A, 36B, and 38 are sewn at their ends to the straps 32. The straps 36A and 36B are attached, such as without limitation by sewing, to the straps 38 at locations 40 where the straps 36A and 36B intersect the straps 38.

In various embodiments, the strap 36A has a length that is longer than the length of the strap 36B. As shown in FIG. 5, the longer length of the strap 36A permits the strap 36A to be placed adjacent an end of horizontal members 42, such as forks, proximal the boom 24. In such embodiments the basket 18 is bolted to a distal end of the horizontal members 42 and the strap 36B is not placed adjacent the horizontal members 42. Accordingly, in such embodiments the strap 36B can be shorter than the strap 36A.

Figure 6A:
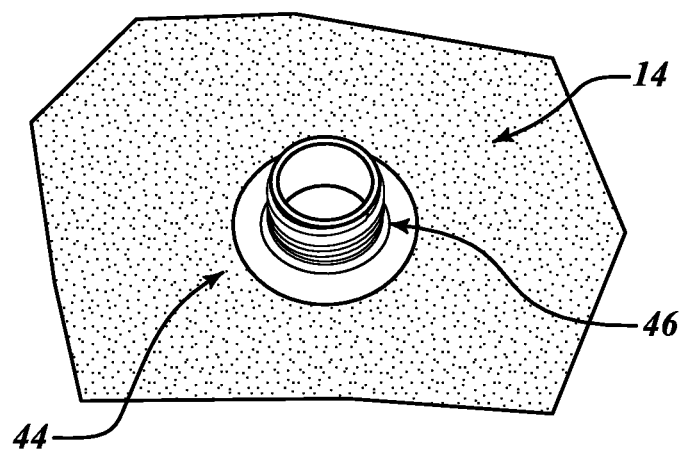
FIGS. 6A-6C illustrate other details of the pan assembly of FIG. 1.

Referring additionally to FIG. 6A, in various embodiments a drainage port 44 may be defined in the pan 14. As shown in FIG. 6A, in various embodiments the drainage port 44 includes a tube 46 having a threaded exterior.

Figure 6B:
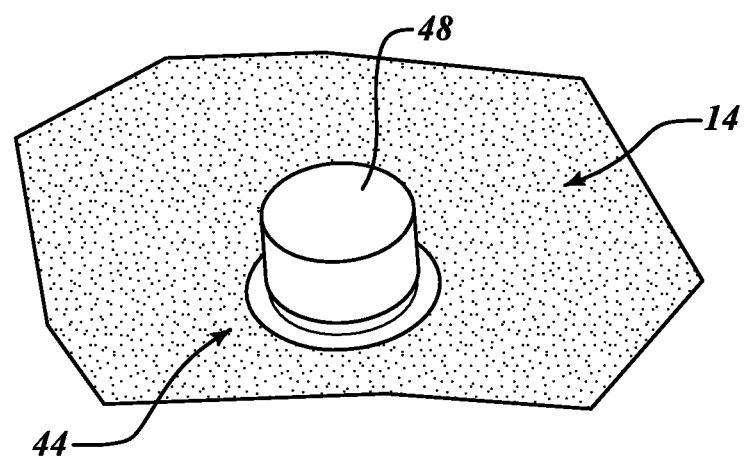

Referring additionally to FIG. 6B, in various embodiments the drainage port 44 may include a fitting 48, such as a cap threadably receivable on the tube 46. In such embodiments and if desired, any contents of the pan 14 may be retained in the pan 14 while the basket 18 remains aloft and may be drained from the pan 14 via the drainage port 44 after the basket no longer remains aloft.

Figure 6C:
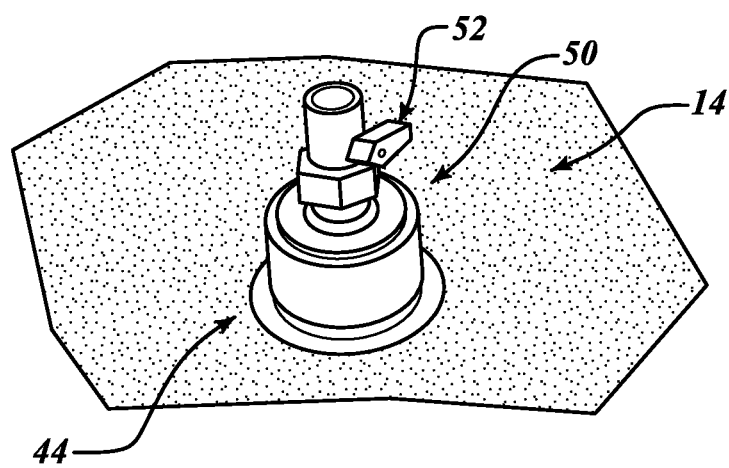

Referring additionally to FIG. 6C, in various embodiments the drainage port 44 may include a fitting 50, such as a hose adapter fitting that includes a valve 52.

Now that various embodiments of the pan assembly 10 have been described, illustrative methods of their attachment to an aerial work platform and their fabrication will be described by way of nonlimiting examples.

In various embodiments, illustrative methods are provided for attaching the pan assembly 10 to an aerial work platform. In an illustrative method of attaching a pan assembly to an aerial work platform, a pan is disposed about a lower portion of a basket of an aerial work platform. The pan is removably attached to a lower portion of a basket of an aerial work platform with attachment mechanisms disposed about an exterior of the pan. A tensioning system disposed within an interior of the pan is engaged to cooperate with the attachment mechanisms to hold the pan onto a lower portion of a basket of an aerial work platform.

In various embodiments, illustrative methods are provided for fabricating the pan assembly 10. In an illustrative method of fabricating a pan assembly, a pan configured to be disposed about a lower portion of a basket of an aerial work platform is formed. Attachment mechanisms are disposed about an exterior of the pan, the attachment mechanisms being configured to removably attach the pan to a lower portion of a basket of an aerial work platform. A tensioning system is disposed within an interior of the pan, the tensioning system being configured to cooperate with the attachment mechanisms to hold the pan onto a lower portion of a basket of an aerial work platform.

In some embodiments, forming the pan configured to be disposed about a lower portion of a basket of an aerial work platform may include defining an accommodation section configured to accommodate structure that attaches a boom of an aerial work platform to a basket of an aerial work platform.

In some embodiments, forming the pan configured to be disposed about a lower portion of a basket of an aerial work platform may include defining at least one vinyl window in the pan.

In some embodiments, disposing attachment mechanisms about an exterior of the pan may include: attaching a first strap to a hook configured to engage a lower portion of a basket of an aerial work platform; receivably engaging the first strap with a cam buckle; and attaching a second strap to the cam buckle and to an exterior of the pan.

In some embodiments, disposing a tensioning system within an interior of the pan may include: disposing a matrix of a plurality of rows of third straps along a major axis of the pan and a plurality of columns of fourth straps along a minor axis of the pan; attaching the third and fourth straps at their ends to the pan and to the second straps; and attaching the plurality of third straps to the plurality of fourth straps at locations where the plurality of third straps intersect the plurality of fourth straps.

In some embodiments, attaching the third and fourth straps at their ends to the pan and to the second straps may include sewing the third and fourth straps at their ends to the second straps.

In some embodiments, attaching the plurality of third straps to the plurality of fourth straps at locations where the plurality of third straps intersect the plurality of fourth straps may include sewing the plurality of third straps to the plurality of fourth straps at locations where the plurality of third straps intersect the plurality of fourth straps.

In some embodiments, a drainage port may be defined in the pan. In some embodiments defining a drainage port in the pan may include threadably receiving on a tube a fitting such as a cap and/or a hose adapter fitting that includes a valve.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While a number of illustrative embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A pan assembly for an aerial work platform, the pan assembly comprising:
    a pan configured to be disposed about a lower portion of a basket of the aerial work platform, the pan including an accommodation section of the pan configured to be disposed about structure that attaches a boom of the aerial work platform to the basket of the aerial work platform, the structure including a mounting bracket couplable to an end of the boom of the aerial work platform, the accommodation section of the pan being configured with a size and shape to accommodate the structure that attaches the boom of the aerial work platform to the basket of the aerial work platform;
    a plurality of attachment mechanisms disposed about an exterior of the pan, the plurality of attachment mechanisms being configured to removably attach the pan to a lower portion of the basket of the aerial work platform, each of the plurality of attachment mechanisms including a hook configured to engage a lower portion of a basket of an aerial work platform, a first strap attached to the hook, a cam buckle configured to receivably engage the first strap, and a second strap attached to the cam buckle and attached to an exterior of the pan; and
    a tensioning system disposed within an interior of the pan, the a tensioning system being configured to cooperate with the plurality of attachment mechanisms to hold the pan onto a lower portion of the basket of the aerial work platform, the tensioning system including a matrix of a plurality of rows of third straps along a major axis of the pan and a plurality of columns of fourth straps along a minor axis of the pan, the third and fourth straps being attached at their ends to the pan and to the second straps, the plurality of third straps being attached to the plurality of fourth straps at locations where the plurality of third straps intersect the plurality of fourth straps.

2. The pan assembly of claim 1, wherein the pan is made of flexible material.

3. The pan assembly of claim 1, wherein the pan is made entirely of vinyl.

4. The pan assembly of claim 1, wherein the pan includes at least one vinyl window.

5. The pan assembly of claim 1, wherein the third and fourth straps are sewn at their ends to the second straps.

6. The pan assembly of claim 1, wherein the plurality of third straps are sewn to the plurality of fourth straps at locations where the plurality of third straps intersect the plurality of fourth straps.

7. The pan assembly of claim 1, wherein one of the plurality of third straps has a length that is longer than others of the plurality of third straps.

8. The pan assembly of claim 1, further comprising:
    a drainage port defined in the pan.

9. The pan assembly of claim 8, wherein the drainage port includes a tube having a threaded exterior.

10. The pan assembly of claim 8, wherein the drainage port further includes a fitting chosen from a cap threadably receivable on the tube and a hose adapter fitting that includes a valve.

11. A method of attaching a pan assembly to an aerial work platform, the method comprising:
    disposing a pan about a lower portion of a basket of the aerial work platform, the pan including an accommodation section of the pan configured to be disposed about structure that attaches a boom of the aerial work platform to the basket of the aerial work platform, the structure including a mounting bracket coupled to an end of the boom of the aerial work platform, the accommodation section of the pan being configured with a size and shape to accommodate the structure that attaches the boom of the aerial work platform to the basket of the aerial work platform;
    removably attaching the pan to a lower portion of the basket of the aerial work platform with a plurality of attachment mechanisms disposed about an exterior of the pan, each of the plurality of attachment mechanisms including a hook configured to engage a lower portion of the basket of the aerial work platform, a first strap attached to the hook, a cam buckle configured to receivably engage the first strap, and a second strap attached to the cam buckle and attached to an exterior of the pan; and engaging a tensioning system disposed within an interior of the pan to cooperate with the plurality of attachment mechanisms to hold the pan onto a lower portion of the basket of the aerial work platform, the tensioning system including a matrix of a plurality of rows of third straps along a major axis of the pan and a plurality of columns of fourth straps along a minor axis of the pan, the third and fourth straps being attached at their ends to the pan and to the second straps, the plurality of third straps being attached to the plurality of fourth straps at locations where the plurality of third straps intersect the plurality of fourth straps.

12. A method of fabricating a pan assembly for an aerial work platform, the method comprising:

forming a pan configured to be disposed about a lower portion of a basket of the aerial work platform, the pan including an accommodation section of the pan configured to be disposed about structure that attaches a boom of the aerial work platform to the basket of the aerial work platform, the structure including a mounting bracket couplable to an end of the boom of the aerial work platform, the accommodation section configured with a size and shape to accommodate the structure that attaches the boom of the aerial work platform to the basket of the aerial work platform;

disposing a plurality of attachment mechanisms about an exterior of the pan, the plurality of attachment mechanisms being configured to removably attach the pan to a lower portion of the basket of the aerial work platform, wherein disposing a plurality of attachment mechanisms about an exterior of the pan includes:

attaching a first strap to a hook configured to engage a lower portion of the basket of the aerial work platform;

receivably engaging the first strap with a cam buckle; and attaching a second strap to the cam buckle and to an exterior of the pan; and disposing a tensioning system within an interior of the pan, the tensioning system being configured to cooperate with the plurality of attachment mechanisms to hold the pan onto a lower portion of the basket of the aerial work platform, wherein disposing a tensioning system within an interior of the pan includes:

disposing a matrix of a plurality of rows of third straps along a major axis of the pan and a plurality of columns of fourth straps along a minor axis of the pan;

attaching the third and fourth straps at their ends to the pan and to the second straps; and attaching the plurality of third straps to the plurality of fourth straps at locations where the plurality of third straps intersect the plurality of fourth straps.

13. The method of claim 12, wherein forming the pan configured to be disposed about a lower portion of the basket of the aerial work platform includes defining an accommodation section configured to accommodate structure that attaches a boom of the aerial work platform to a basket of the aerial work platform.

14. The method of claim 12, wherein forming the pan configured to be disposed about a lower portion of the basket of the aerial work platform includes defining at least one vinyl window in the pan.

15. The method of claim 12, wherein attaching the third and fourth straps at their ends to the pan and to the second straps includes sewing the third and fourth straps at their ends to the second straps.

16. The method of claim 12, wherein attaching the plurality of third straps to the plurality of fourth straps at locations where the plurality of third straps intersect the plurality of fourth straps includes sewing the plurality of third straps to the plurality of fourth straps at locations where the plurality of third straps intersect the plurality of fourth straps.

17. The method of claim 12, further comprising:

defining a drainage port in the pan.

18. The method of claim 17, wherein defining a drainage port in the pan includes threadably receiving on a tube a fitting chosen from a cap and a hose adapter fitting that includes a valve.

19. The pan assembly of claim 1, wherein the accommodation section of the pan has a generally arcuate structure.

* * * * *